H. HALSEY.
ELECTRIC BATTERY.
APPLICATION FILED MAY 6, 1903.
1,014,146.
Patented Jan. 9, 1912.
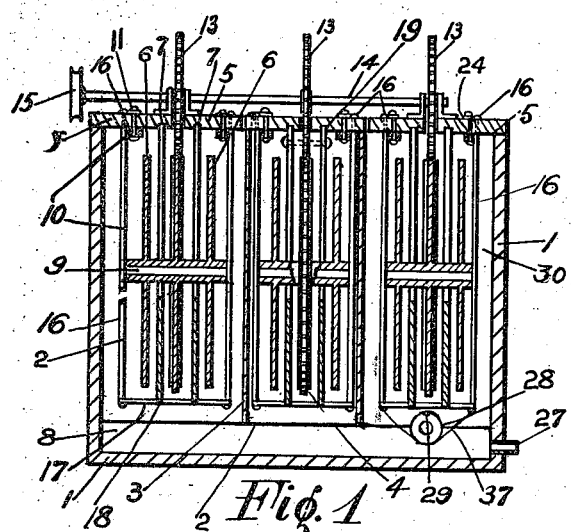
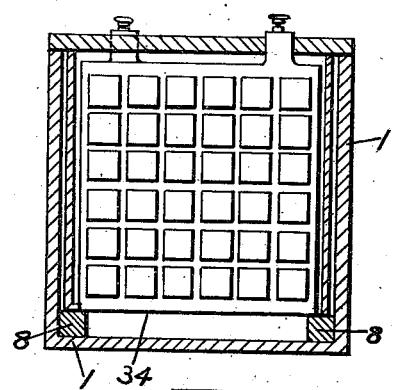
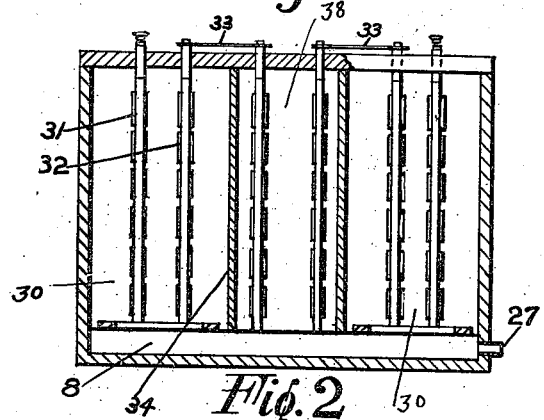
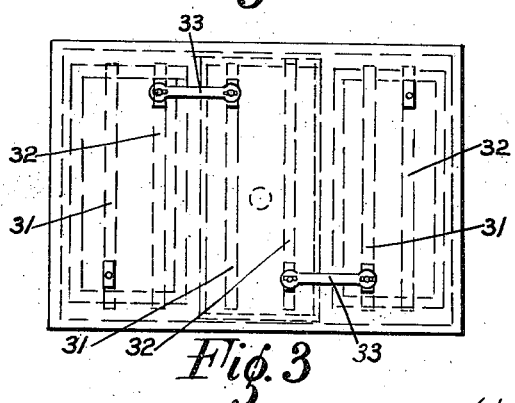
Witnesses
Julius T. Wooster.
George N. Kerr.
Henry Halsey Inventor
By his Attorney C. W. Edwards

UNITED STATES PATENT OFFICE.

HENRY HALSEY, OF NEW YORK, N. Y., ASSIGNOR TO HALSEY ELECTRIC GENERATOR COMPANY, A CORPORATION OF NEW JERSEY.

ELECTRIC BATTERY.

1,014,146.  Specification of Letters Patent.  Patented Jan. 9, 1912.

Application filed May 6, 1903. Serial No. 155,858.

*To all whom it may concern:*

Be it known that I, HENRY HALSEY, a citizen of the United States, residing at New York, in the county of New York and State of New York, have invented certain new and useful Improvements in Electric Batteries, of which the following is a full, clear, and exact specification.

This invention relates to electric batteries and has for its object to obviate the necessity of having a separate receptacle and electrolyte for each cell.

In storage batteries, for instance, it is essential that the electrolyte be kept at approximately constant strength and that the plates be at all times submerged. Where a large number of cells are used each cell must be frequently inspected and its electrolyte tested. It also frequently happens that the plates break their jars on account of expansion and warping, and interrupt the circuit by allowing the electrolyte to escape.

By my invention I propose to do away with these disadvantages by providing a common electrolyte in which all of the cells are immersed, and divided from each other by suitable partitions having openings therein through which the electrolyte can circulate. The electrolyte will thus be kept at the same strength and at the same height in all of the cells and if one jar should be broken, the circuit would not be affected.

In the case of primary batteries there are equal advantages secured by the use of a common electrolyte for all of the cells. The common electrolyte can be agitated to depolarize the electrodes and thus the necessity for separate depolarizing devices for each cell is done away with. There is consequently less power consumed in depolarizing the electrodes. If the electrodes are movable, a circulation will be created which will aid in the depolarization. Where a chemical depolarizer is used, it will be evenly distributed to all of the cells.

A primary or secondary battery embodying my invention comprises a plurality of cells separated from each other by partitions which have openings therein to permit free circulation of the electrolyte. There will be a considerable saving in weight because it will be unnecessary to provide a separate receptacle for each cell, a partition or receptacle with openings for each alternate cell being sufficient.

Referring to the drawings, Figure 1 is a longitudinal section of a primary battery embodying my invention, Fig. 2 is a longitudinal view of a secondary battery, Fig. 3 is a plan view of the battery shown in Fig. 2. Fig. 4 is a side view of one cell. Fig. 5 is a plan view of one cell in Fig. 1 showing the connections.

1 is a tank or large receptacle in which the cells 2 are contained. Each cell has a casing or partition 3, supported on ledges 8, and open to permit circulation of the electrolyte which is contained in the tank 1. Covers 5 support the electrodes 6 and 7 in the electrolyte. The cover 5 is made of hard rubber or other non-conducting material. The electrodes 6 are rotatable and are fixed on a shaft 9 which has bearings in the hangers 10 attached to the under sides of the covers by bolts 11. The electrode 6 is composed of one or more disks carried on a hub. One of the disks carries a gear which meshes with a spur gear 13 of non-corrosive material mounted on the cover 5. The gear 13 is mounted on a shaft 14 which is driven from any suitable motor through pulley 15. The shaft 14 is continuous and drives all of the electrodes 6.

Attached to the cover 5 by bolts 16 is a frame 17 which supports the fixed electrodes 7 in grooves 18. There are similar grooves 19 in the cover in which the upper ends of the electrodes 7 rest. These electrodes are substantially rectangular in shape and are cut out from the top toward the center to permit the shaft 9 and hub of the movable electrodes 6 to be inserted. The rods or bolts 16 are incased in insulating tubes which form shoulders and enable the frame 17 to be rigidly supported. The electrodes 7 may be connected with a binding post 23 carried on the cover. The bolts 11 are connected by a plate 24 which carries a binding post 25.

27 is a pipe through which a blast of air may be supplied to agitate the electrolyte. Or, paddles operated from a suitable motor may be used instead. A chemical depolarizer may be contained in a receptacle 28 supported by a band 37, having an orifice 29 permitting the depolarizer to be distributed to the electrolyte and to the cells.

Referring to Figs. 2, 3 and 4. 30, 38, represent storage cells each comprising the positive and negative plates 31 and 32 connected in series by bars 33. The alternate cells 38 have casings or partitions 34 supported on ledges 8. The open partitions permit free circulation of the electrolyte. The cells 30, it will be observed, have no partitions of their own but are immersed directly in the large tank 1. The plates rest on the ledges 8. This arrangement is also applied to the primary battery shown in Fig. 1.

The storage battery may be provided with mechanical depolarizing means if it is desired, but I have not considered it necessary to show such a construction.

I do not wish to be limited to the exact construction shown, as the invention may be applied in a number of different ways without departing from the scope of the invention.

Having thus described my invention, I declare that what I claim as new and desire to secure by Letters Patent is:—

1. In a battery, the combination of a receptacle, a plurality of sets of electrodes, each set forming a couple, an electrolyte common to all of said electrodes, partitions in said receptacle forming casings and open at the bottom to permit flow of the electrolyte and interposed between said sets of electrodes, separate frames for suspending the respective sets of electrodes, each frame being attached to its cover, and insulated terminals carried by each cover and respectively connected to the electrodes of opposite polarity.

2. In a battery, the combination of a receptacle, a plurality of sets of fixed and movable electrodes, each set forming a couple, an electrolyte common to all of said electrodes, partitions in said receptacle forming casings and open at the bottom to permit flow of the electrolyte and interposed between said sets of electrodes, separate covers for each casing, a frame for separately suspending each set of electrodes, each frame being attached to its cover, a driven device carried by each cover for moving the movable electrode of its corresponding set, a common means for driving said driven devices, and insulated terminals carried by each cover and respectively connected to the electrodes of the different polarities of its corresponding set.

In testimony whereof I affix my signature, in presence of two witnesses.

HENRY HALSEY.

Witnesses:
 JULIAN S. WOOSTER,
 GEORGE N. KERR.